Figure 1:
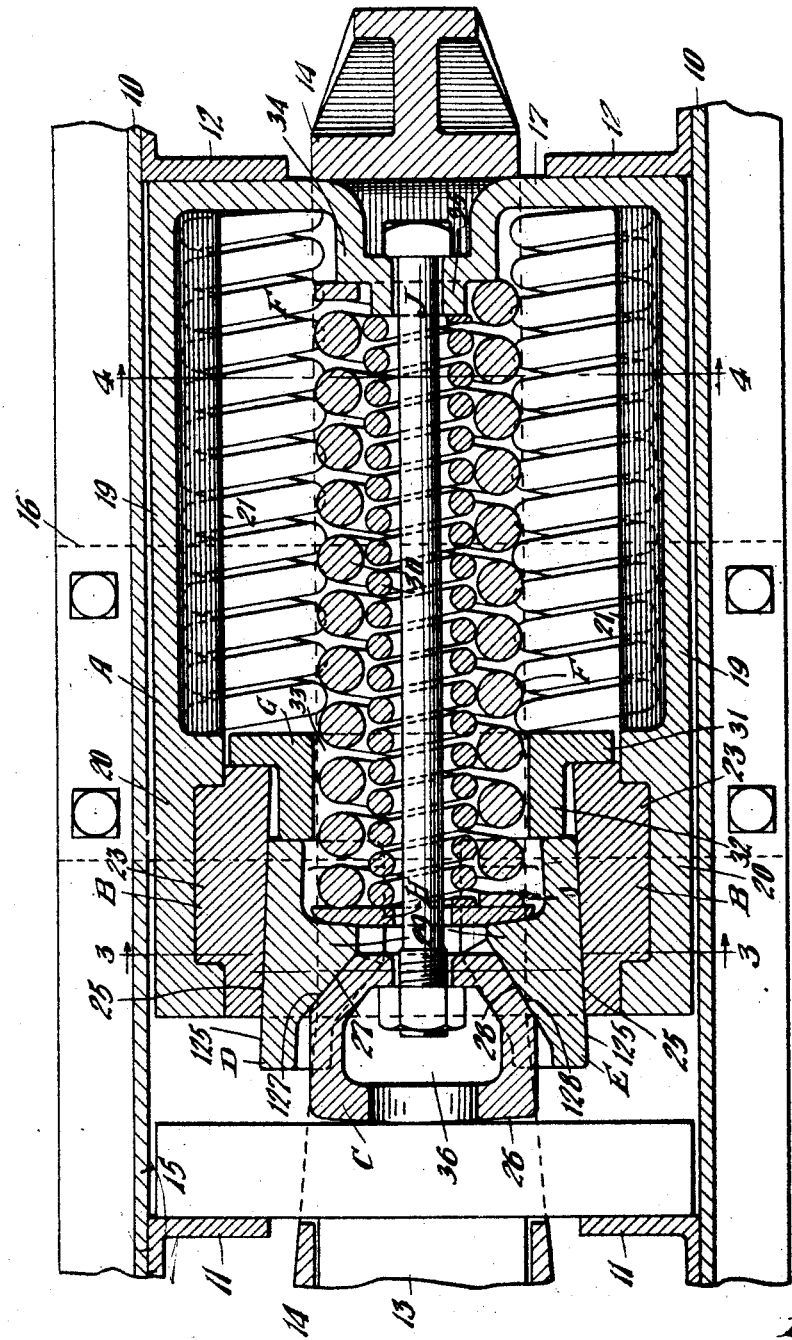

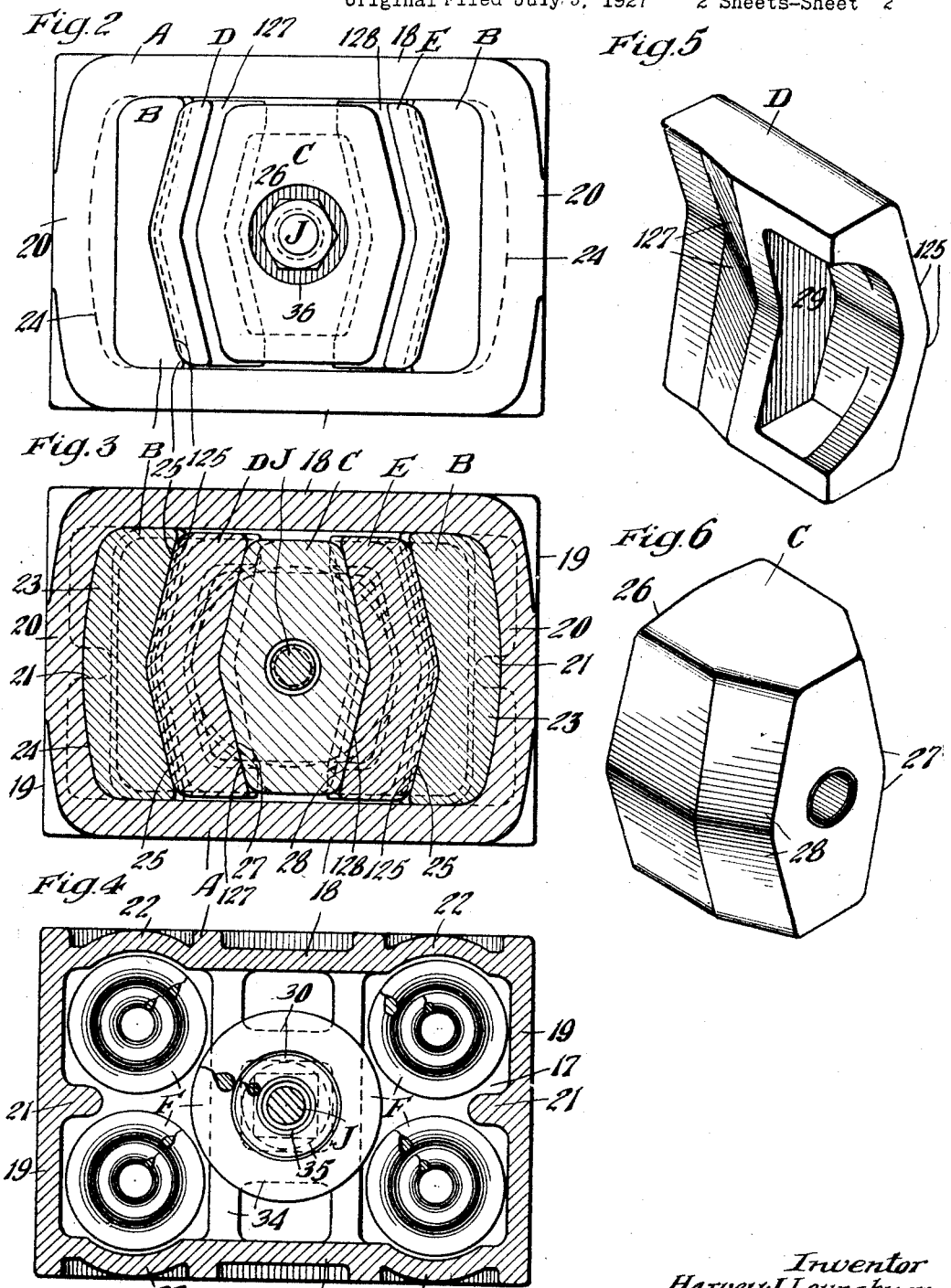

Patented Feb. 26, 1929.

1,703,277

UNITED STATES PATENT OFFICE.

HARVEY J. LOUNSBURY, OF GLEN ELLYN, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed July 5, 1927, Serial No. 203,498. Renewed July 19, 1928.

This invention relates to improvements in friction shock absorbing mechanisms.

One object of the invention is to provide a friction shock absorbing mechanism especially adapted for railway draft riggings, including a combined friction shell and spring cage, wherein the friction shell is provided with detachable liners with which friction means co-operates, the arrangement being such that the friction means is confined to movement in a direction lengthwise of the mechanism to maintain the friction means out of contact with the inactive surfaces of the friction shell portion of the cage in order to prevent wear of the same and prolong the life of the mechanism.

Another object of the invention is to provide a friction shock absorbing mechanism of the character indicated including a casing provided with detachable liners at one end thereof presenting interior friction surfaces, a friction wedge system co-operating with the liners and spring resistance means opposing relative movement of the friction means and the casing wherein the co-operating parts of the friction system and the liners and the casing are so designed as to confine movement of the friction system to a direction longitudinal of the mechanism and maintain the liners against displacement, thereby preventing engagement of the active parts of the friction system and the non-active surfaces of the casing to eliminate wear of the parts.

A still further object of the invention is to provide a friction shock absorbing mechanism especially adapted for railway draft riggings, including a spring cage provided at one end thereof with detachable liners presenting interior friction surfaces and defining a friction shell, a spring resistance means within the cage co-operating with the friction means of the mechanism wherein the spring cage is open at one end only and all the walls thereof are substantially solid to provide the maximum column strength, and the spring resistance means is so designed and arranged as to occupy the maximum available spring space thereby obtaining exceptionally high spring and combined spring and frictional capacity.

Yet another object of the invention is to provide a friction shock absorbing mechanism of the character indicated, including; a casing open at one end only and having all of the walls thereof solid enclosing a spring resistance means composed of a centrally arranged relatively heavy spring element and four relatively lighter spring elements disposed in pairs at opposite sides of the mechanism; friction means at the open end of the casing comprising detachable liners presenting interior friction surfaces; a friction system co-operating with the shell; and a spring follower co-operating with the outer springs, the follower being provided with an opening through which the central spring extends; the central spring directly co-operating with the friction system and outward movement of the spring follower being limited by engagement with abutment means on the liners.

Other and further objects and advantages of the invention will more fully and clearly appear from the description and claims hereinafter following.

In the drawings, forming a part of this specification, Figure 1, is a horizontal, longitudinal, sectional view of a railway draft rigging showing my improvements in connection therewith. Figure 2 is a front end elevational view of the shock absorbing mechanism proper. Figure 3 is a transverse vertical sectional view of the shock absorbing mechanism proper corresponding substantially to the line 3—3 of Figure 1. Figure 4 is a vertical transverse sectional view corresponding substantially to the line 4—4 of Figure 1. And Figures 5 and 6 are detailed perspective views, respectively of a friction shoe and the wedge block employed in connection with my improved mechanism.

In said drawings, 10—10 indicate channel-shaped center or draft sills of a railway car underframe, to the inner sides of which are secured the usual front stop lugs 11—11 and rear stop lugs 12—12. The inner end of the drawbar is designated by 13, to which is operatively connected a yoke 14 of well known form. The shock absorbing mechanism proper, as well as a front main follower 15 are disposed within the yoke, and the yoke and the parts supported therewithin are maintained in operative position by a detachable saddle plate 16, secured to the draft sills.

My improved shock absorbing mechanism proper comprises broadly a casing A, provided with interior liners B—B; a main wedge C, two friction shoes D and E; a spring resistance F; a spring follower G; a spring follower disk H, and a retainer bolt J.

The casing A is of substantially rectangular box-like form and has a transverse vertically disposed rear end wall 17, longitudinally extending horizontally disposed spaced top and bottom walls 18—18, and longitudinally extending vertically disposed spaced side walls 19—19. The end wall 17, co-operates with stop lugs 12 in the manner of the usual rear follower. At the forward end the side walls 19 are inwardly enlarged or thickened as indicated at 20. The side walls of the casing are also provided with interior longitudinally extending centrally disposed re-enforcing ribs 21, rearwardly of the enlarged portions of the side walls. As most clearly shown in Figure 4, the top and bottom walls 18 of the casing are provided with interior longitudinally extending pocket-like sections 22 at the opposite sides thereof to receive the corresponding side portions of the outer coils of the spring resistance means. That portion of the casing rearwardly of the enlarged sections 20 of the side walls defines the spring cage portion of the casing. The liners B, which are two in number, are in the form of relatively heavy plate-like members. Each liner B is provided with a lateral enlargement 23 having a rounded outer face as most clearly shown in Figure 3, the enlarged section 23 being seated in a pocket 24 provided in section 20 of the corresponding side wall of the casing. As will be evident, the enlarged portion 23 of the liner which is seated in the pocket 24 secures the liner against longitudinal movement with respect to the casing when the parts of the mechanism are assembled. On the inner side each liner B is provided with a longitudinally extending friction surface 25 of V-shaped form. As most clearly shown in Figure 1, the opposed V-shaped friction surfaces 25 of the liners B converge inwardly of the mechanism. Upon the reference to Figures 2 and 3 it will be seen that the liners B are of such an overall height as to substantially fit between the top and bottom walls 18 of the casing, thereby preventing displacement thereof vertically. The liners B together with the forward sections of the top and bottom walls 18 of the casing define the friction shell section of the mechanism.

The wedge block C is provided with a slightly curved bearing surface 26 at the outer end thereof adapted to engage directly the inner side of the follower 15. At the inner end the wedge block C is provided with a pair of inwardly converging wedge faces 27 and 28 on the opposite sides thereof. The wedge faces 27 and 28 are of V-shaped section for a purpose hereinafter pointed out. The wedge face 27 is preferably disposed at a relatively blunt releasing angle with respect to the longitudinal axis of the mechanism and the wedge face 28 is disposed at a relatively keen wedging angle with respect to said axis, as most clearly illustrated in Figure 1.

The friction shoes D and E are disposed at opposite sides of the mechanism each being interposed between the wedge block C and the liner B at the corresponding side of the mechanism. The two friction shoes D and E are of similar design, except as hereinafter pointed out. Each of the shoes is provided with a longitudinally extending friction surface 125 on the outer side thereof co-operating with the friction surface 25 of the liner B. The friction surface 125 is of V-shaped section so as to inter-fit with the friction surface 25. On the inner side each shoe is laterally enlarged as indicated at 29. The enlargement 29 is provided with an outer wedge face co-operating with the wedge face of the blocks C on the same side of the mechanism. The wedge face of the shoe D is designated by 127 and the wedge face of the shoe E is designated by 128. The wedge faces 127 and 128 are of V-shaped section so as to inter-fit with the corresponding wedge faces 27 and 28 of the wedge block C. As clearly shown in Figure 1, the wedge face 127 is disposed at a relatively blunt angle so as to properly co-operate with the blunt angle face 27 of the wedge block C while the wedge face 128 is disposed at a relatively keen wedging angle so as to co-operate properly with the wedge face 28 of said wedge block. By the arrangement of V-shaped inter-engaging faces on the wedge block C and shoes D and E and V-shaped interengaging surfaces on the shoes D and E and liners B, movement of the members C, D and E is restricted to a direction longitudinally of the mechanism.

The spring resistance means F comprises a plurality of elements so arranged as to occupy substantially the entire spring space of the casing. As most clearly shown in Figures 1 and 4 the spring resistance means includes a central spring element 30 including a relatively light inner coil and a heavier outer coil. The remaining elements of the spring resistance F surround or are disposed about the central element 30, there being four such spring resistance elements, each element being located in one of the corners of the casing. Each of the last named elements includes a relatively light inner coil and a heavier outer coil, the outer coil being appreciably smaller than the outer coil of the central spring element 30. The four spring elements disposed about the spring element 30 have their rear ends bearing on the end wall 17 of the casing A, and their front ends bearing on the spring follower G which is interposed between these spring elements and the friction shoes D and E.

The spring follower G comprises a relatively heavy plate-like section 31 having a forwardly extending sleeve-like cylindrical portion 32 projecting therefrom. As most clearly shown in Figure 1, the heavy plate-like section is provided with a central opening 33 which is continuous with the opening of the cylindrical sleeve-like section 32. The spring follower G is of such a width that the plate-like section 31 thereof engages behind the liners B, thus limiting outward movement of the spring follower. The opening 33 of the spring follower G is of such a size as to loosely accommodate the outer coil of the spring element 30. The spring element 30, as clearly shown in Figure 1, has the front end section thereof extending through the spring follower G, a spring follower disk H being interposed between the spring element 30 and the enlargements 29 of the friction shoes D and E. The inner end of the spring resistance 30 bears on a hollow boss 34, forwardly projecting from and formed integral with the end wall 17 of the cage A. The outer coil of the element 30 bears directly on the end of said boss, while the inner end of the inner coil bears on a cylindrical extension 35 of said boss.

The mechanism is held assembled and maintained of uniform length by the retainer bolt J, which has the head thereof anchored within the hollow boss 34 and the nut at the opposite end thereof disposed within an opening 36 provided in the wedge block C.

When the mechanism is assembled the retainer bolt is so adjusted that the spring resistance element 30 is under initial compression. The remaining spring elements of the spring resistance F are also so proportioned that they are under initial compression when in assembled relation with the other parts of the mechanism.

Compensation for wear of the various friction and wedge faces is had by the expansive action of the spring resistance element 30 which as hereinbefore pointed out is normally under initial compression. The tendency of the spring element 30 to expand will urge the friction shoes D and E outwardly thus holding the same in contact with the wedge faces of the block C and the friction surfaces of the liners B as wear of the same takes place.

The operation of my improved shock absorbing mechanism assuming a compression stroke is as follows:

The main follower 15 and the casing A will be moved relatively toward each other thereby carrying the wedge block C inwardly of the casing A. Due to the inward movement of the block C the friction shoes D and E will be wedged apart thereby forcing the same into intimate contact with the friction surfaces of the liners B. In addition, the friction shoes D and E will be carried inwardly of the mechanism during the inward movement of the wedge block C sliding on the friction surfaces of the liners thereby producing high frictional resistance. Inward movement of the friction shoes effects compression of the spring resistance F, the spring resistance element 30 being compressed independently of the remaining spring resistance elements of the means F and the latter elements being compressed through the medium of the spring follower G actuated by the friction shoes. The described action will continue either until the actuating force is reduced or inward movement of the follower 15 is limited by engagement with the forward end of the casing. Upon engagement of the follower 15 with the casing, the actuating force will be transmitted directly through the casing, the latter acting as a column element relieving the springs from undue compression.

When the actuating force is reduced, in release, the spring resistance F will carry the friction shoes outwardly, the latter in turn forcing the wedge block C outwardly also until movement of the latter is positively limited by the retainer bolt J.

From the foregoing description taken in connection with the drawings, it will be evident that I have provided an exceedingly simple and rugged shock absorbing mechanism of exceptionally high capacity having great column strength, wherein the maximum amount of spring space available is utilized to make possible the use of high capacity spring means, wherein the friction surfaces of the mechanism and especially those of friction shell section thereof are readily renewable to take care of wear and wherein the movable friction system is maintained out of contact with the inactive surfaces of the friction shell to prevent undue wear of these parts, thereby adding greatly to the life of the mechanism.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism the combination with a spring cage having opposed side walls; of a spring resistance within said cage including a central member and a plurality of members disposed about said central member; detachable liners mounted on two of said opposed side walls and held against movement relative thereto; friction shoes co-operating with the liners; wedge pressure transmitting means engaging the shoes; a spring follower through which said central member of the spring extends; said spring follower being interposed between the shoes and the spring members disposed about said central member.

2. In a friction shock absorbing mechanism, the combination with a spring cage having opposed walls, said cage being open at one end only; of detachable liners secured to the said opposed walls, said liners presenting interior friction surfaces; friction shoes co-operating with the liners; pressure transmitting means having wedging engagement with the shoes, said pressure transmitting means, shoes and liners having inter-engaging wedge and friction surfaces limiting movement of the pressure transmitting means and shoes to a direction lengthwise of the mechanism and holding the pressure transmitting means and shoes spaced from the walls of the cage; spring resistance means including a central spring element and four additional spring elements disposed about said central element; and a spring follower interposed between the last named spring elements and the shoes, said central spring element extending freely through the spring follower and co-operating with the shoes.

3. In a friction shock absorbing mechanism, the combination with a spring cage open at one end; of detachable liners secured to opposed wall portions of said cage at the open end thereof, said liners defining with the remaining wall portions of the cage a friction shell means at said open end, said liners being confined against displacement by said remaining wall portions; a wedge pressure transmitting member, said member and cage being relatively movable toward and away from each other; a pair of friction shoes interposed between the wedge and the liners, said wedge and shoes having inter-engaging wedge faces limiting movement of the wedge and shoes to a direction lengthwise of the mechanism, said shoes having friction surfaces inter-engaged with friction surfaces of the liners and limiting movement of said shoes to a direction lengthwise of the shell; a spring resistance means opposing inward movement of said shoes; a plurality of spring resistance elements disposed about said spring resistance means; and a spring follower through which said spring resistance means extends, said spring follower being interposed between the shoes and spring resistance elements and having its outward movement limited by engagement with the liners.

4. In a friction shock absorbing mechanism, the combination with a spring cage open at one end; of detachable liners secured to opposed wall portions of said cage; a wedge pressure transmitting member; a pair of friction shoes interposed between the wedge pressure transmitting member and liners, said wedge pressure transmitting member and shoes having inter-engaging wedge faces limiting movement of the wedge and shoes to a direction lengthwise of the mechanism, said shoes having friction surfaces inter-engaging with the friction surfaces of the liners and limiting movement of said shoes to a direction lengthwise of the mechanism; spring resistance means opposing inward movement of the shoes; a plurality of spring resistance elements disposed about said spring resistance means; and means for transmitting the actuating force from said shoes to the spring resistance elements.

5. In a friction shock absorbing mechanism, the combination with a casing having continuous top, bottom and side walls said casing being open at one end only; of a pair of liners detachably connected to the opposed side walls of the casing, said liners being held against vertical displacement by said top and bottom walls, said liners together with said top and bottom walls defining a friction shell section, and said casing rearwardly of said friction shell section forming a spring cage; a main wedge block; a pair of friction shoes interposed between the wedge block and liners, said shoes and wedge block having inter-engaging wedge faces of V-shaped section, and said shoes and liners having inter-engaging friction surfaces of V-shaped section; and spring resistance means within the cage opposing inward movement of said shoes.

6. In a friction shock absorbing mechanism, the combination with a spring cage having continuous top, bottom and side walls, said cage being open at one end only; of detachable liners secured to said side walls of the cage, said liners presenting opposed interior V-shaped friction surfaces; a pair of friction shoes having V-shaped friction surfaces co-operating with said liner friction surfaces; a wedge block, said wedge block and shoes having co-operating V-shaped wedge faces, said wedge and cage being relatively movable toward and away from each other; spring resistance means opposing inward movement of the shoes; four additional spring resistance elements surrounding said central spring resistance means and disposed at the corners of said cage; said spring means and spring resistance elements occupying substantially the entire available spring space of the cage; and a spring follower interposed between the spring resistance elements and the friction shoes.

In witness that I claim the foregoing I have hereunto subscribed my name this 2d day of July, 1927.

HARVEY J. LOUNSBURY.